(12) United States Patent
Busse et al.

(10) Patent No.: US 9,241,136 B2
(45) Date of Patent: Jan. 19, 2016

(54) METHOD AND APPARATUS FOR CREATING A PERSONALIZED PROGRAMMING GUIDE

(75) Inventors: Martin Busse, Woburn, MA (US); Jimena Velarde, Arlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 856 days.

(21) Appl. No.: 12/647,744

(22) Filed: Dec. 28, 2009

(65) Prior Publication Data

US 2010/0333142 A1 Dec. 30, 2010

Related U.S. Application Data

(63) Continuation-in-part of application No. 12/493,906, filed on Jun. 29, 2009.

(51) Int. Cl.
*H04N 21/25* (2011.01)
*H04N 21/262* (2011.01)
*H04N 21/2668* (2011.01)
*H04N 21/475* (2011.01)
*H04N 21/482* (2011.01)
*H04N 21/658* (2011.01)
*H04N 7/173* (2011.01)

(52) U.S. Cl.
CPC ......... *H04N 7/17318* (2013.01); *H04N 21/252* (2013.01); *H04N 21/2668* (2013.01); *H04N 21/26283* (2013.01); *H04N 21/4755* (2013.01); *H04N 21/4826* (2013.01); *H04N 21/6582* (2013.01)

(58) Field of Classification Search
CPC .......... H04N 21/252; H04N 21/26283; H04N 21/2668; H04N 21/4755; H04N 21/4826; H04N 21/4828; H04N 21/6582
USPC ...................................................... 725/37–61
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,479,266 A | 12/1995 | Young et al. |
| 5,479,268 A | 12/1995 | Young et al. |
| 5,499,103 A | 3/1996 | Mankovitz |
| 5,512,963 A | 4/1996 | Mankovitz |
| 5,515,173 A | 5/1996 | Mankovitz et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,600,711 A | 2/1997 | Yuen |
| 5,619,274 A | 4/1997 | Roop et al. |
| 5,640,484 A | 6/1997 | Mankovitz |

(Continued)

*Primary Examiner* — Randy Flynn

(57) ABSTRACT

An approach is provided for creating a personalized programming guide. A guide manager receives input from a user for creating a personalized programming guide. The guide manager retrieves one or more search criteria associated with a community of other users to construct a query. The guide manager then performs the query and displays the results of the query in a personalized programming guide.

20 Claims, 10 Drawing Sheets

(56) References Cited

U.S. PATENT DOCUMENTS

| | | |
|---|---|---|
| 5,684,525 A | 11/1997 | Klosterman |
| 5,699,107 A | 12/1997 | Lawler et al. |
| 5,701,383 A | 12/1997 | Russo et al. |
| 5,706,145 A | 1/1998 | Hindman et al. |
| 5,727,060 A | 3/1998 | Young |
| 5,734,786 A | 3/1998 | Mankovitz |
| 5,790,198 A | 8/1998 | Roop et al. |
| 5,801,787 A | 9/1998 | Schein et al. |
| 5,808,608 A | 9/1998 | Young et al. |
| 5,809,204 A | 9/1998 | Young et al. |
| 5,812,205 A | 9/1998 | Milnes et al. |
| 5,828,945 A | 10/1998 | Klosterman |
| 5,870,150 A | 2/1999 | Yuen |
| 5,886,746 A | 3/1999 | Yuen et al. |
| 5,915,026 A | 6/1999 | Mankovitz |
| 5,923,362 A | 7/1999 | Klosterman |
| 5,940,073 A | 8/1999 | Klosterman et al. |
| 5,949,954 A | 9/1999 | Young et al. |
| 5,959,688 A | 9/1999 | Schein et al. |
| 5,969,748 A | 10/1999 | Casement et al. |
| 5,970,206 A | 10/1999 | Yuen et al. |
| 5,974,222 A | 10/1999 | Yuen et al. |
| 5,987,213 A | 11/1999 | Mankovitz et al. |
| 5,988,078 A | 11/1999 | Levine |
| 5,991,498 A | 11/1999 | Young |
| 6,002,394 A | 12/1999 | Schein et al. |
| 6,016,141 A | 1/2000 | Knudson et al. |
| 6,028,599 A | 2/2000 | Yuen et al. |
| 6,049,652 A | 4/2000 | Yuen et al. |
| 6,052,145 A | 4/2000 | Macrae et al. |
| 6,072,983 A | 6/2000 | Klosterman |
| 6,075,551 A | 6/2000 | Berezowski et al. |
| 6,075,575 A | 6/2000 | Schein et al. |
| 6,078,348 A | 6/2000 | Klosterman et al. |
| 6,091,882 A | 7/2000 | Yuen et al. |
| 6,118,492 A | 9/2000 | Milnes et al. |
| 6,133,909 A | 10/2000 | Schein et al. |
| 6,137,950 A | 10/2000 | Yuen |
| 6,144,401 A | 11/2000 | Casement et al. |
| 6,151,059 A | 11/2000 | Schein et al. |
| 6,167,188 A | 12/2000 | Young et al. |
| 6,177,931 B1 | 1/2001 | Alexander et al. |
| 6,216,265 B1 | 4/2001 | Roop et al. |
| 6,239,794 B1 | 5/2001 | Yuen et al. |
| 6,247,176 B1 | 6/2001 | Schein et al. |
| 6,262,722 B1 | 7/2001 | Allison et al. |
| 6,263,501 B1 | 7/2001 | Schein et al. |
| 6,323,911 B1 | 11/2001 | Schein et al. |
| 6,341,195 B1 | 1/2002 | Mankovitz et al. |
| 6,341,374 B2 | 1/2002 | Schein et al. |
| 6,388,714 B1 | 5/2002 | Schein et al. |
| 6,396,546 B1 | 5/2002 | Alten et al. |
| 6,412,110 B1 | 6/2002 | Schein et al. |
| 6,430,358 B1 | 8/2002 | Yuen et al. |
| 6,430,359 B1 | 8/2002 | Yuen et al. |
| 6,453,471 B1 | 9/2002 | Klosterman |
| 6,460,181 B1 | 10/2002 | Donnelly |
| 6,466,734 B2 | 10/2002 | Yuen et al. |
| 6,469,753 B1 | 10/2002 | Klosterman et al. |
| 6,477,705 B1 | 11/2002 | Yuen et al. |
| 6,498,895 B2 | 12/2002 | Young et al. |
| 6,505,348 B1 | 1/2003 | Knowles et al. |
| 6,538,701 B1 | 3/2003 | Yuen |
| 6,549,719 B2 | 4/2003 | Mankovitz |
| 6,564,379 B1 | 5/2003 | Knudson et al. |
| 6,567,606 B2 | 5/2003 | Milnes et al. |
| 6,588,013 B1 | 7/2003 | Lumley et al. |
| 6,668,133 B2 | 12/2003 | Yuen et al. |
| 6,687,906 B1 | 2/2004 | Yuen et al. |
| 6,732,369 B1 | 5/2004 | Schein et al. |
| 6,742,183 B1 | 5/2004 | Reynolds et al. |
| 6,745,391 B1 | 6/2004 | Macrae et al. |
| 6,756,997 B1 | 6/2004 | Ward et al. |
| 6,760,537 B2 | 7/2004 | Mankovitz |
| 6,799,326 B2 | 9/2004 | Boylan et al. |
| 6,799,327 B1 | 9/2004 | Reynolds et al. |
| 6,850,693 B2 | 2/2005 | Young et al. |
| 6,859,799 B1 | 2/2005 | Yuen |
| 7,039,935 B2 | 5/2006 | Knudson et al. |
| 7,069,576 B1 | 6/2006 | Knudson et al. |
| 7,082,613 B1* | 7/2006 | Mineyama ............ 725/46 |
| 7,487,529 B1 | 2/2009 | Orlick |
| 2001/0013126 A1 | 8/2001 | Lemmons et al. |
| 2001/0029610 A1 | 10/2001 | Corvin et al. |
| 2001/0047298 A1 | 11/2001 | Moore et al. |
| 2001/0054181 A1 | 12/2001 | Corvin |
| 2002/0073424 A1 | 6/2002 | Ward et al. |
| 2002/0124255 A1 | 9/2002 | Reichardt et al. |
| 2002/0184625 A1* | 12/2002 | Allport ............ 725/39 |
| 2003/0005445 A1 | 1/2003 | Schein et al. |
| 2003/0028889 A1 | 2/2003 | McCoskey et al. |
| 2003/0056219 A1 | 3/2003 | Reichardt et al. |
| 2003/0110495 A1 | 6/2003 | Bennington et al. |
| 2003/0110499 A1 | 6/2003 | Knudson et al. |
| 2003/0115599 A1 | 6/2003 | Bennington et al. |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0177494 A1* | 9/2003 | Satterfield et al. ........... 725/41 |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0204847 A1 | 10/2003 | Ellis et al. |
| 2003/0208756 A1 | 11/2003 | Macrae et al. |
| 2004/0010806 A1 | 1/2004 | Yuen et al. |
| 2004/0045025 A1 | 3/2004 | Ward et al. |
| 2004/0107437 A1 | 6/2004 | Reichardt et al. |
| 2004/0117848 A1* | 6/2004 | Karaoguz et al. ........... 725/134 |
| 2004/0168189 A1 | 8/2004 | Reynolds et al. |
| 2004/0194138 A1 | 9/2004 | Boylan et al. |
| 2004/0261098 A1 | 12/2004 | Macrae et al. |
| 2005/0010949 A1 | 1/2005 | Ward et al. |
| 2005/0028201 A1 | 2/2005 | Klosterman et al. |
| 2005/0125823 A1 | 6/2005 | McCoy et al. |
| 2005/0149964 A1 | 7/2005 | Thomas et al. |
| 2005/0155056 A1 | 7/2005 | Knee et al. |
| 2005/0216936 A1 | 9/2005 | Knudson et al. |
| 2005/0251824 A1 | 11/2005 | Thomas et al. |
| 2006/0020973 A1 | 1/2006 | Hannum et al. |
| 2006/0156336 A1 | 7/2006 | Knudson et al. |
| 2006/0212894 A1 | 9/2006 | Knudson et al. |
| 2006/0277574 A1 | 12/2006 | Schein et al. |
| 2006/0288366 A1 | 12/2006 | Boylan et al. |
| 2007/0016926 A1 | 1/2007 | Ward et al. |
| 2007/0033613 A1 | 2/2007 | Ward et al. |
| 2007/0107010 A1 | 5/2007 | Jolna et al. |
| 2007/0118873 A1* | 5/2007 | Houh et al. ............ 725/136 |
| 2007/0186241 A1* | 8/2007 | Sugimoto et al. ............ 725/46 |
| 2007/0288959 A1* | 12/2007 | Istvan et al. ............ 725/39 |
| 2008/0270446 A1* | 10/2008 | Gossweiler et al. ......... 707/102 |
| 2008/0276279 A1* | 11/2008 | Gossweiler et al. ......... 725/46 |
| 2009/0064228 A1* | 3/2009 | Lin ................. 725/46 |
| 2009/0113475 A1* | 4/2009 | Li .................. 725/39 |
| 2009/0320072 A1 | 12/2009 | McClanahan et al. |
| 2010/0299701 A1* | 11/2010 | Liu et al. .......... 725/39 |

* cited by examiner

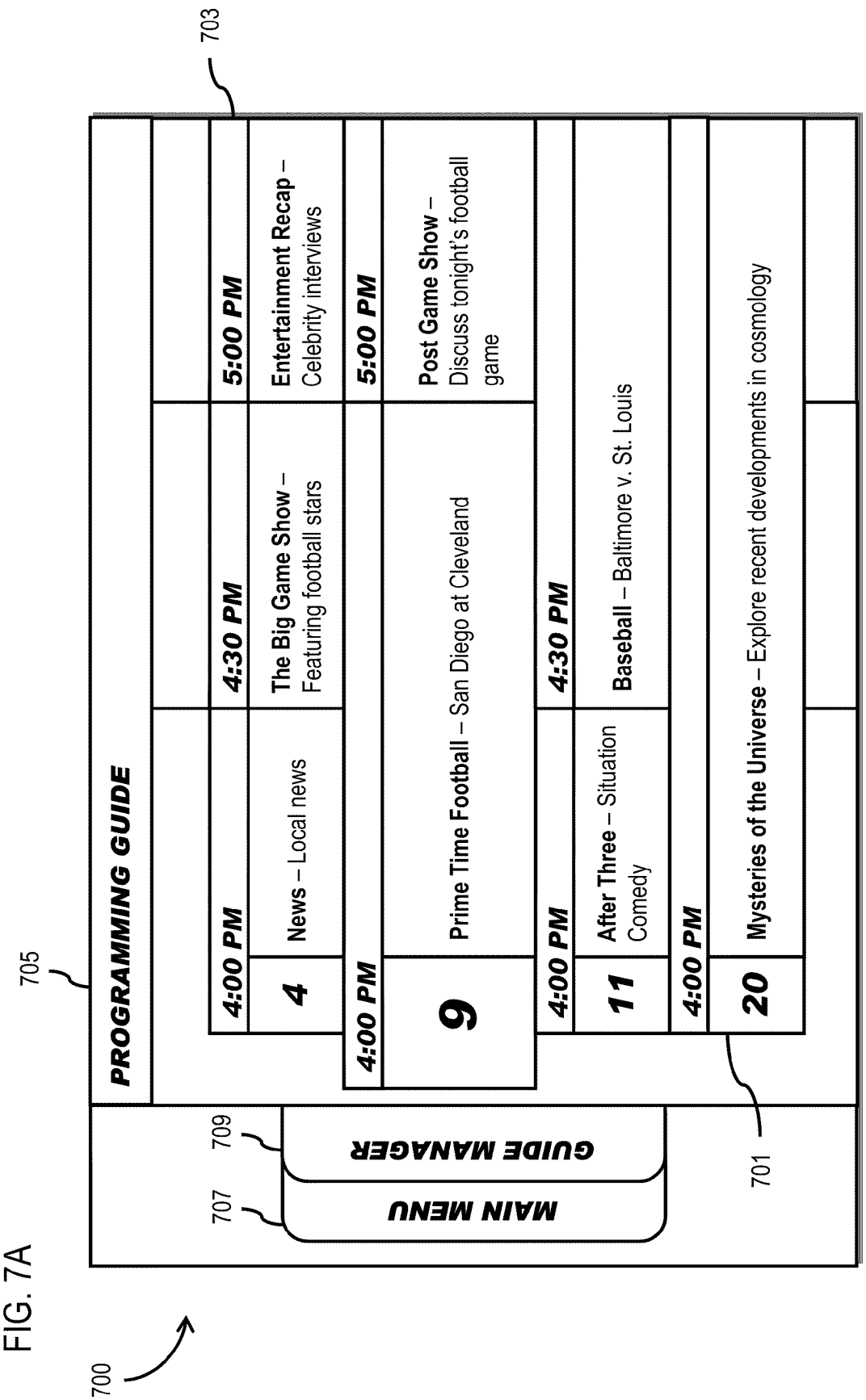

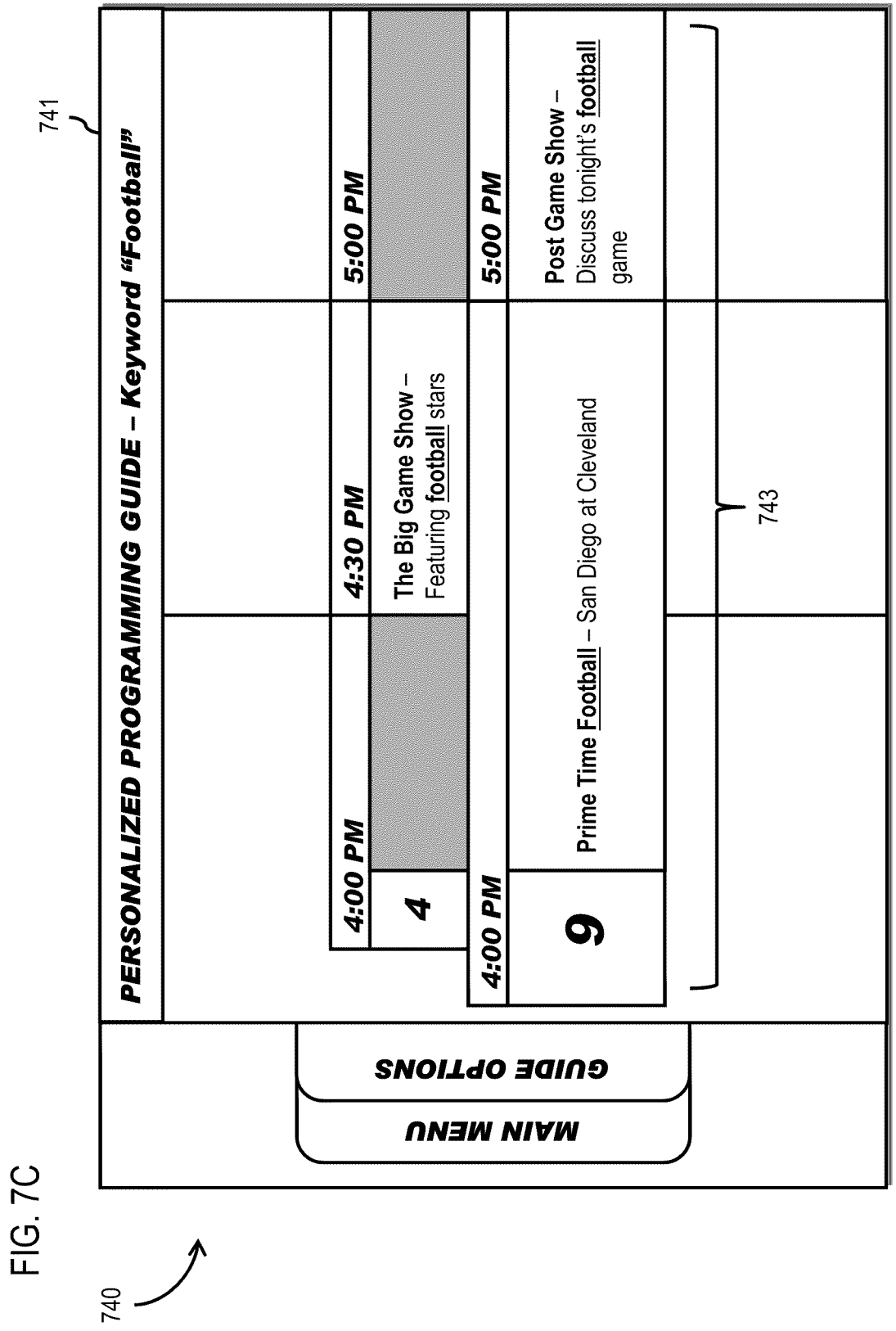

METHOD AND APPARATUS FOR CREATING A PERSONALIZED PROGRAMMING GUIDE

RELATED APPLICATIONS

This application is a continuation in part of U.S. patent application Ser. No. 12/493,906 filed Jun. 29, 2009, entitled "Search-Based Media Program Guide Systems and Methods"; the entirety of which is incorporated herein by reference.

BACKGROUND INFORMATION

With the advent of computers, interactive electronic communications, and the Internet, as well as advances in the digital realm of consumer information, has come a reinvention of conventional entertainment and communication services to enhance programming, recording, and viewing of multimedia, such as broadcast television programs. Today, it is not uncommon for consumers to have access to hundreds, if not thousands, of media programs from a multitude of sources such as broadcast television, on-demand programming, and other third party content providers available through the Internet. However, while the programming choices available to consumers have progressed, the way consumers access and view those choices have not kept pace. In many cases, a consumer has to sift through a programming guide including thousands of programs to discover programs of interest to the consumer. As a result, the consumer often is either unable to find or cannot easily find the programs that the consumer would like to view.

Therefore, there is a need for an approach for creating a personalized programming guide to facilitate discovering programs of interest.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 7A-7D are diagrams of user interfaces utilized in the processes of FIGS. 3-5, according to various embodiments.

DESCRIPTION OF THE PREFERRED EMBODIMENT

A preferred apparatus, method, and system for creating a personalized programming guide are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing audio-video (AV) signals for presentation to a user, such as a home communication terminal (HCT), a digital home communication terminal (DHCT), a stand-alone personal video recorder (PVR), a television set, a digital video disc (DVD) player, a video-enabled phone, an AV-enabled personal digital assistant (PDA), and/or a personal computer (PC), as well as other like technologies and customer premises equipment (CPE).

Figure 1:
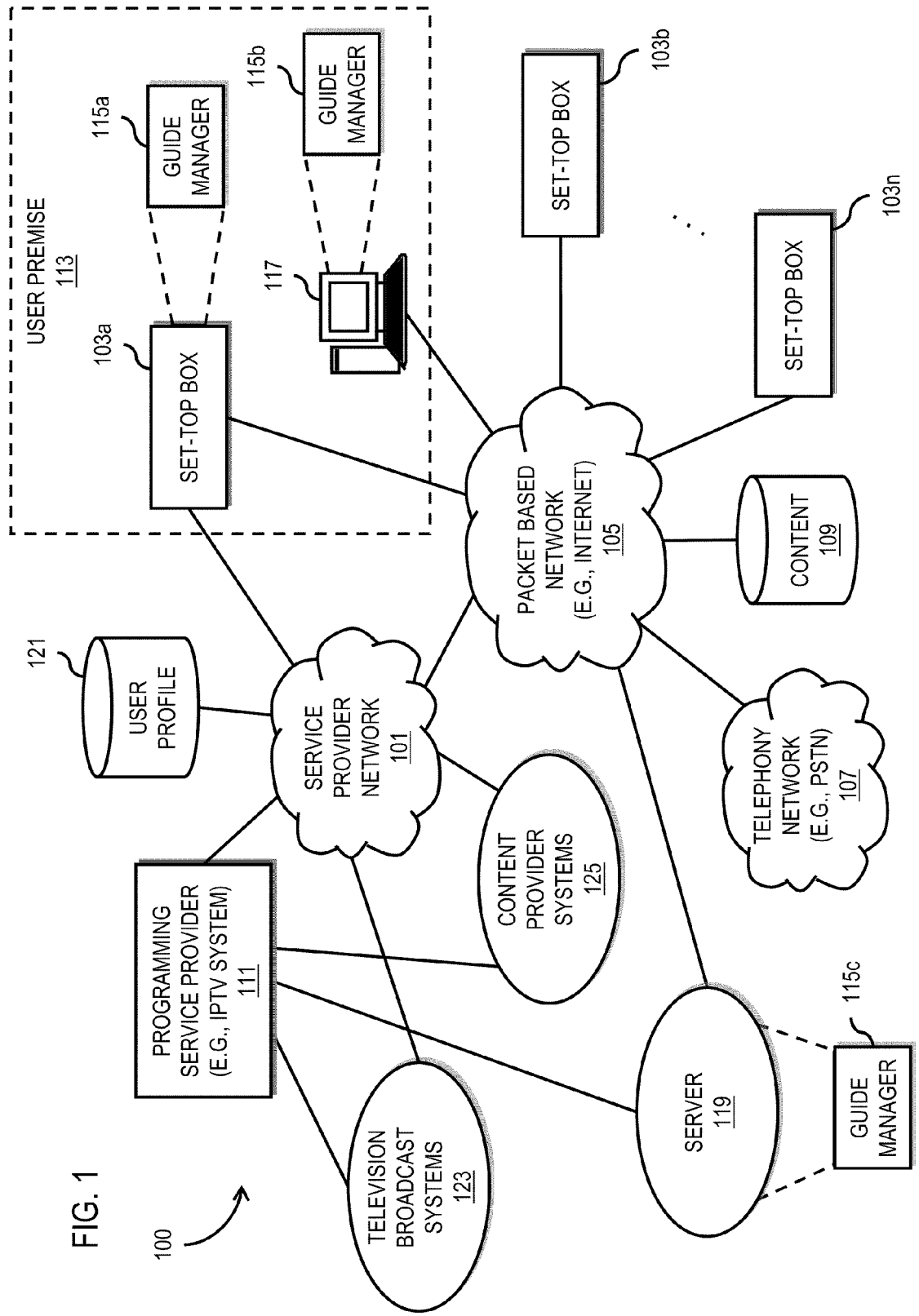
FIG. 1 is a diagram of a system capable of creating a personalized programming guide, according to an exemplary embodiment.

FIG. 1 is a diagram of a system capable of creating a personalized programming guide, according to an exemplary embodiment. A system 100 can be configured to create a personalized programming guide of the content available over a service provider network 101. For example, the programming content may include any audio-visual content (e.g., broadcast television programs, digital video recorder (DVR) content, on-demand programs, pay-per-view programs, IPTV (Internet Protocol Television) feeds, DVD related content, etc.), pre-recorded media content, data communication services content (e.g., commercials, advertisements, videos, movies, songs, audio books, etc.), Internet-based content (e.g., streamed video, streamed audio), and/or any other equivalent media form. In one embodiment, the personalized programming guide is created according to one or more criteria (e.g., search criteria) specified by, for instance, a user of a set-top box (STB) (e.g., STB 103a) or a community of users operating set-top boxes within the same system 100 and/or service provider network 101 (e.g., STBs 103b-103n). It is contemplated that the criteria may also be implicitly specified by, for instance, monitoring the viewing or recording habits of user of the STB or the community of users. For example, creating a personalized programming guide enables the system 100 to filter content from the general all-encompassing programming guide or programming data to present the user with those programs that are more likely to be of interest to the user. Moreover, in one embodiment, the system 100 leverages the viewing and recording histories as well as the recommendations of a community of users to help discover programming that may be of interest to the user. It is contemplated that system 100 may embody many forms and include multiple and/or alternative components and facilities.

It is observed that even with the advent of the Internet and high-speed data connections, television remains the prevalent global medium for entertainment and information. For example, television users continue to be presented with an ever increasing amount and variety of programming choices. It is not uncommon for television users to have access to hundreds of programming channels dedicated to any of a number subjects. In fact, as traditional television programming (e.g., "over-the-air" programming, cable programming, satellite programming, etc.) merges with the online content (e.g., network-streamed content, on-demand content, Internet programming, media-sharing websites, etc.), the available programming choices are likely to continue to explode. For example, internet protocol television (IPTV) service providers are currently offering subscribers various video services ranging from multi-channel video programming that mimics traditional broadcast television, to true video-on-demand (VOD) programming. These services are further supplemented with interactive video applications that enable robust programming content, selection and navigation functionality, as well as integrated digital video recording, and data services to enhance the video experience. These shared protocols create integrated value propositions with regard to accessible content.

Historically, users have relied on programming guides to navigate through available programming and content. These guides generally list programming content by, for instance, channel, date, and time. As a result, finding a specific program from among the myriad of available programs using a traditional programming guide can be difficult and cumbersome, particularly as the number of programs grows. Thus, it is apparent that improvements are needed to provide consumers with the ability to experience the programming content they want, at any time they desire, using those devices designed to maximize the multimedia experience. To address this problem, the system 100 of FIG. 1 enables the creation of a personalized programming guide based on the results of a query or search conducted according to one or more specified search criteria (e.g., keywords, recommendations, history of recordings, viewing history, programming type, or a combination thereof) for display and use on the consumer's device (e.g., STB 103a) over the service provider network 101. Moreover, the system 100 enables the user to access search criteria specified by other users (e.g., a community of users). This community of other users may be, for instance, specified by the user, the service provider, content provider, television broadcast provider, etc. or any combination thereof. For example, the community may reflect the tastes of a wide range of users (e.g., when the community includes a wide and non-selective group of users) or a specific group of users (e.g., when the community is specifically tailored according to interests, hobbies, demographics, or other like characteristics). In one embodiment, the one or more search criteria for creating a personalized guide may represent the search criteria that are most often selected by the community (e.g., programming associated with top searches, most recommended, most viewed, most recorded, etc.). In this way, the user can more easily begin to personalized programming guide data by relying on criteria specified other users that might share similar interests.

As shown in FIG. 1, service provider network 101 integrates the television medium with that of the telecommunications, computing, and media environments, thereby broadening the scope of devices and sources available to individuals for obtaining programming content. In this manner, system 100 relieves network operators from the burden and expense of providing parallel avenues to content, by enabling users, via user equipment (e.g., STB 103a), to receive programming content accessible over traditional transmission systems (e.g., broadcast, cable, satellite, fiber optic cable) as well as over a data network (e.g., packet-based network 105). Although the user equipment is described with respect to an STB, it is contemplated that various embodiments have applicability to any device capable of processing audio and/or video streams.

In a typical scenario, an individual (e.g., a subscriber of the service provider network 101) may establish a link between a data network source (e.g., content repository 109) and a programming service provider 111 to create a personalized programming guide of content capable of being experienced at a user premise 113 via an STB (e.g., STB 103a). By way of example, the content may be delivered or transmitted over any appropriate mechanism including delivery via in-band adjacent-channels to conventional video broadcasting channels, such as multicast (e.g., live television) or unicast (e.g., stored video) streams. Other implementations may provide programming content on a sideband, in the vertical blanking interval, as a sub-channel, or using out-of-band signals, as well as any other suitable transmission technique. In this regard, the personalized programming guide may provide a directory of content accessible over any number of analog or digital channels offered to subscribers at any suitable frequency or rate (e.g., continuously, periodically, on-demand, etc.). In addition or alternatively, the personalized programming guide may include content that is resident, stored, or recorded on the STB (e.g., STB 103a).

A guide manager application (e.g., guide manager 115a) enables users to easily, effectively, and intuitively create personalized programming guides for programming content accessible over the service provided network 101 or the data network 105. In other embodiments, one or more guide manager applications 115a-115c may enable content specified in the personalized programming guide to be retrieved and presented to a user via STB (e.g., STB 103a). Still further, guide manager applications 115a-115c may enable users to create personalized programming guides and make the guides available to other subscribers, i.e., to share personalized programming guides with another STB (e.g., STBs 103b-103n). As such, embodiments of the service provider network 101 may also enable individuals utilizing STBs to interact with one another, through personalized communications channels, to further facilitate the processes described herein.

Programming content broadly includes any audio-visual content (e.g., broadcast television programs, VOD programs, pay-per-view programs, IPTV feeds, DVD related content, etc.), pre-recorded media content, data communication services content (e.g., commercials, advertisements, videos, movies, songs, images, sounds, etc.), Internet services content (streamed audio, video, or pictographic media), and/or any other equivalent media form. In this manner, the programming service provider 111 may provide (in addition to the provider's own programming content) content obtained from other sources, such as one or more television broadcast systems 123, one or more third-party content provider systems 125, content residing in a repository 109 or accessible via server 119, as well as available via one or more packet-based networks 105 or telephony networks 107, etc.

Programming service provider 111 can provide content that is retrieved over the packet-based network 105, as well as provide conventional media streams. For instance, programming service provider 111 may provide "virtual channels" to content traditionally limited to host sites, such as end user originated content uploaded to audio, video, and/or pictographic sharing sites. Additionally, the programming content may include streamed audio and/or video from conventional broadcast providers. It is noted that programming content can be any type of information provided from any source having connectivity to system 100.

In this manner, guide manager applications 115a and 115b may be executable, for example, as one or more user interfaces capable of local implementation on an STB (e.g., STB 103a-103n) or on an end terminal 117, such as a computer, telephony device, mobile device, or other like mechanism. Thus, exemplary embodiments of guide manager applications 115a and 115b may be provided through navigation shell applications, e.g., menu applications having options corresponding to different functions. By way of example, computer devices may include desktop computers, notebook computers, servers, terminal workstations, gaming systems, customized hardware, or other equivalent apparatus. Telephony devices may comprise plain-old-telephones, wireless telephones, cellular telephones, satellite telephones, voice over internet protocol telephones, and the like. Mobile devices may include personal digital assistants (PDA), pocket personal computers, smart phones, tablets, handsets, portable gaming systems, and customized hardware, as well as other mobile technologies capable transmitting data. Moreover, STBs 103a-103n may be used alone or in combination with one or more end terminal(s) 117 to implement various exemplary embodiments.

The STBs 103a-103n and/or terminal 117 can communicate using the packet-based network 105 and/or the telephony network 107. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (WiFi) networks, other wireless networks (e.g., 3G wireless broadband networks, mobile television networks, radio networks, etc.), terrestrial broadcasting networks, provider specific networks (e.g., a Verizon® FiOS® network, a TiVo network, etc.), and the like. Such networks may also utilize any suitable protocol supportive of data communications, e.g., transmission control protocol (TCP), internet protocol (IP), file transfer protocol (FTP), telnet, hypertext transfer protocol (HTTP), asynchronous transfer mode (ATM), socket connections, Ethernet, frame relay, and the like, to connect STBs 103a-135n to various sources of media content. Although depicted in FIG. 1 as separate networks, packet-based network 105 and/or telephony network 107 may be completely or partially contained within service provider network 101. For example, service provider network 101 may include facilities to provide for transport of packet-based and/or telephony communications.

By way of example, STB 103a-103n, as well as terminal 117, can remotely access one or more servers (e.g., server 119), via a communication interface (not illustrated), configured to execute multiple instances of guide manager application 115c. That is, guide manager application 115c may be provided in a distributed fashion using, for instance, client-server architectures, such as implemented by enterprise application service providers (ASP). It is noted that ASP models (and other like architectures) offer system scalability in terms of administrative scalability, geographic scalability, and/or load scalability. Thus, distributed environments are attractive modes for disseminating system 100 functionality to a broad spectrum of users and devices.

For example, server 119 can be an "online" system capable of communicating with one or more third-party web servers (not illustrated), content repositories (e.g., repository 109), or equivalent facilities, to provide users various avenues to locate, specify, receive, and/or share programming content, guide search criteria, personalized programming guides, and the like that are accessible over a data network (e.g., packet-based network 105). For example, exemplary embodiments of guide manger application 115c may comprise hypertext markup language (HTML) user interfaces or JAVA™ applets stored on server 119 and accessed via world-wide-web pages. These interfaces are particularly useful in extending system 100 functionality to devices having limited resources (e.g., PDAs, handsets, thin-clients, etc.). In alternative embodiments, server 119 is collocated with and/or integrated into programming service provider 111. As such, multiple users, interfaces, and instances of guide manager application 115c can be simultaneously realized through system 100.

In the example of FIG. 1, STBs 103a-103n are located at one or more user premises (e.g., user premise 113), and geospatially associated with one or more regions. STBs 103a-103n may be configured to communicate with and receive signals and/or data streams from a programming service provider 111 (or other transmission facility) in response to processes of one or more guide manager application(s) 115a-115c. These signals include programming guide information, data, and related content retrieved over a data network (e.g., service provider network 101, packet-based network 105, and/or telephony network 107), as well as conventional video broadcast content.

Programming service provider 111 can include one or more programming content servers (not illustrated) and/or data repositories (not shown). Alternatively, user profile repository 121, content repository 109, or server 119 may be accessed via one or more service provider networks 101 and/or packet-based networks 105. In one embodiment, the user profile repository 121 stores user settings, preferences, and configuration information for the guide manager 115a. Further, service provider network 101 may include a system administrator (not shown) for operational and management functions to deploy the virtual channel service using, for instance, an internet protocol television (IPTV) system. In this manner, STBs 103a-103n can utilize any suitable technology to draw, receive, and/or transmit media content from/to a programming service provider 111 or other content source/sink. A more detailed explanation of an exemplary STB is provided with respect to FIG. 2.

In an exemplary embodiment, STBs 103a-103n can draw, receive, and/or transmit programming guide information, data, and related content from (or to) multiple sources, thereby alleviating the burden on any single source, e.g., programming service provider 111, to gather, supply, or otherwise meet the content demands of any user or premise. Thus, particular embodiments enable authenticated third-party television broadcast systems 123, third-party content provider systems 125, and servers (e.g., server 119) to transmit programming content accessible over a data network to STBs 103a-103n either apart from, or in conjunction with, programming service provider 111. Such programming content may include content regarding traffic, news, sports, current events, breaking stories, commentary, headlines, advertisements, solicitations, financial advice, stocks, markets, events, schools, governments, blog entries, podcasts, and the like. Moreover, media content may be available from authenticated sources, including grassroots groups or individuals, non-profits, governmental organizations, public/private institutions, etc.

The programming guide information, data, and related content may be distinguished (or otherwise categorized) utilizing metadata included therewith or appended thereto. Metadata can be generally considered data about data; but more specifically, it can be utilized to describe all aspects of, and programming content distributed by, system 100. Namely, metadata can include descriptions about: data aspects (file name, type, administrator, size, location, version, or include timestamps, mode bits, arbitrary attribute-value pairs, etc.), titles, activities/events, individuals and organizations involved, intended audiences (e.g., ethnicities, ages, genders, incomes, educational levels, disabilities, mobilities, as well as other like demographic statistics), geospatial identifications (intended zip codes, school districts, communities, etc.), locations of supplementary information and processes, access methods, limitations, timing of activities/events (e.g., start/end dates), as well as motivations, policies and rules. As such, metadata may be utilized by various components of system 100 for control or guiding purposes. In particular embodiments, system 100 may structure and encode metadata to describe characteristics of the content-bearing entities to aid in the identification, discovery, assessment, and management of the programming content by guide manager applications 115a-115c. For example, the guide manager 115a may apply a query or search according to specified search criteria to the metadata associated with programming content to create a personalized programming guide.

In addition or alternatively, the metadata can be used to optimize compression algorithms or perform other computational tasks by the components of system 100. The metadata might be utilized to share personalized programming guides or programming content among a plurality of STBs 103a-103n. Various other embodiments might use metadata to suggest criteria for creating personalized programming guides of content sources that may be of interest to a user based on information stored in a user profile. A more detailed explanation of user profiles is provided with respect to FIG. 2.

In various embodiments, service provider network 101 may include one or more video and/or audio processing modules (not shown) for acquiring and transmitting programming guide information and related content feeds (including content accessible over a data network) from programming service provider 111, the television broadcast systems 123, the third-party content provider systems 125, or servers 119 over one or more of the networks 101, 105, 107, to particular STBs 103a-103n. Accordingly, service provider network 101 may include facilities to support compression/decompression, coding/decoding, modulation/demodulation, optical/electrical conversion, and analog/digital conversion, as well as any other suitable signal processing and/or transmission operation. Further, service provider network 101 can optionally support end-to-end data encryption in conjunction with programming guide creation and related content streaming services such that only authorized users are able to access personalized programming guides and experience content reference therein.

Accordingly, system 100 may include an authentication module (not shown) configured to perform authorization/authentication services and determine whether users or content sources are indeed subscribers to, or providers of, the personalized programming guide service. An authentication schema may require a user name and password, a key access number, a unique machine identifier (e.g., media access control (MAC) address), etc., as well as a combination thereof. Once a subscriber has authenticated a presence on system 100, the user may bypass additional authentication procedures for executing later applications (e.g., programming content streaming instances). Data packets, such as cookies, may be utilized for this purpose. Thus, once an STB or content source is authenticated, connections between the STBs 103a-103n and the content sources may be established directly or through the programming service provider 111.

In other embodiments, authentication procedures on a first device (e.g., STB 103a) may identify and authenticate a second device (e.g., terminal 117) communicatively coupled to, or associated with, the first device. Further, the authentication module may grant users the right to receive programming guide information, data, search criteria, personalized programming guides, and related content from multiple system 100 sources by revoking existing sets of digital certificates associated with a particular provider, and issuing new sets of digital certificates mapped to a second provider. In this regard, an STB (e.g., STB 103a) may receive new programming content or guide information from a second source, whereas the previous session may be automatically closed when the "old" or prior certificates associated with the first source are revoked. This enables users to initiate secure sessions at any given STB 103a-103n (or end terminal 117) linked to system 100, whether or not the STB (or end terminal) belongs to that individual user. It is additionally contemplated that multiple rights sessions may exist concurrently. Further the rights sessions, enables sharing programming guide search criteria and other related information among the STBs 103a-103n.

In particular embodiments, programming service provider 111 may comprise an IPTV system configured to support the transmission of television video programs from the broadcast systems 123 as well as other content, such as content from the various third-party sources (e.g., 109, 119, 123, 125) utilizing internet protocol (IP). That is, the IPTV system 111 may deliver programming guide information, signals and/or streams, including programming content accessible over a data network, in the form of IP packets. Further, the transmission network (e.g., service provider network 101) may optionally support end-to-end data encryption in conjunction with the streaming services, as previously mentioned.

In this manner, the use of IP permits television services to be integrated with broadband Internet services, and thus, share common connections to a user site. Also, IP packets can be more readily manipulated, and therefore, provide users with greater flexibility in terms of control and offers superior methods for increasing the availability of programming guide information and related content. Delivery of video content, by way of example, may be through a multicast from the IPTV system 111 to the STBs 103a-103n. Any individual STB may tune to a particular content source by simply joining a multicast (or unicast) of the media content, utilizing an IP group membership protocol (IGMP). For instance, the IGMP v2 protocol may be employed for joining STBs to new multicast (or unicast) groups. Such a manner of content delivery avoids the need for expensive tuners to view media content, such as television broadcasts; however, other delivery methods, such as directly modulated carriers (e.g., national television systems committee (NTSC), advanced television systems committee (ATSC), quadrature amplitude modulation (QAM)), may still be utilized. It is noted that conventional delivery methods may also be implemented and combined with the advanced methods of system 100. Further, the programming content may be provided to various IP-enabled devices, such as those computing, telephony, and mobile apparatuses previously delineated.

An STB (e.g., STB 103a) may integrate all the functions of an IPTV system, as well as combine the programming content functions of the various online or off-line environments, in a manner that seamlessly toggles between a general programming guide available to all users and a user-created personalized programming guide. It is contemplated that the personalized programming guide service may be extended to users with a presence on the Internet. In alternative embodiments, the services of system 100 could be extended to users having an end terminal (not shown), such as a plain old telephone service (POTS) device, connected to the telephony network 111. While system 100 is illustrated in FIG. 1, the exemplary components are not intended to be limiting, and indeed, additional or alternative components and/or implementations may be utilized.

In one embodiment, the personalized programming guide service is a managed service, whereby a service provider operates the guide manager 115a and system 100 to serve one or more subscribers.

Figure 2:
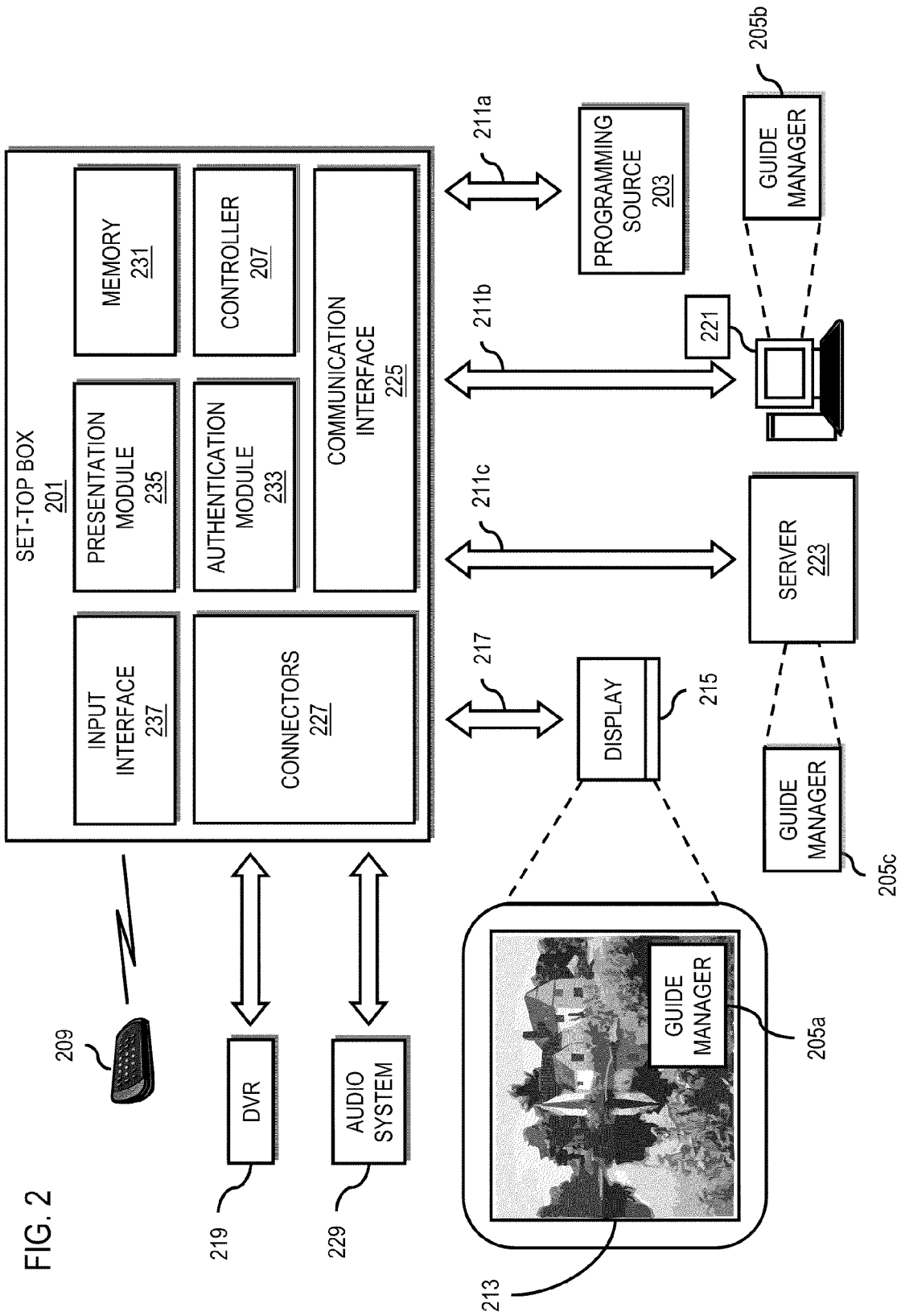
FIG. 2 is a diagram of a set-top box configured to create a personalized programming guide, according to an exemplary embodiment.

FIG. 2 is a diagram of a set-top box configured to create a personalized programming guide, according to an exemplary embodiment. STB 201 may comprise any suitable technology to receive one or more content streams from a media source 203, such as the IPTV system of FIG. 1. The content streams include programming guide information and related content retrieved over the service provider network 101, in response to commands from one or more guide manager application(s) 205a-205c, for presentation via STB 201. The STB 201 may then apply specified criteria to search the programming guide information provided in the content streams to create a personalized programming guide. The personalized programming guide based on the criteria enables a user to more easily find programming content of interest from among the growing variety of available content. As discussed previously, the search criteria may be specified by the user or a community of users within, for instance, the service provider network 101.

Accordingly STB 201 may comprise computing hardware (such as described with respect to FIG. 8) and include additional components configured to provide specialized services related to the reception, display, and sharing of programming guide information and related content (e.g., remote control capabilities, conditional access functions, tuning functions, presentation functions, multiple network interfaces, audio/video signal ports, etc.). Alternatively, the functions and operations of STB 201 may be governed by a controller 207 that interacts with each of the STB components to provide programming guide information and related content retrieved from an audio or video-sharing site, as well as from another STB device or component of system 100. In turn, the user may be afforded greater functionality utilizing a control device 209 to control the personalized programming guide service and related services, as will be more fully described below.

As such, STB 201 may be configured to process programming guide information and related content streams (e.g., streams 211a-211c), including causing a guide manger application 205a and/or one or more components of a programming guide or personalized programming guide and the media content referenced therein (e.g., video component 213 and/or an audio component) to be presented on (or at) display 215. Presentation of the programming guide information and related content may include: displaying, recording, playing, rewinding, forwarding, toggling, selecting, zooming, or any other processing technique that enables users to navigate the programming guide and experience content streams 211a-211c. For instance, STB 201 may provide one or more signals 217 to a display 215 (e.g., television) so that the display 215 may present (e.g., display) the personalized programming guide created by the guide manager application 205a as an overlay on the programming content (e.g., video 213).

In one embodiment, the personalized programming guide is displayed in the same manner as the all-encompassing general programming guide or data (e.g., as a grid or list) with the exception that programming content not meeting specified search criteria are removed from the guide. In other words, the personalized programming guide reduces the programming information displayed at any one time to enable the user to more quickly find and discover programs of interest by not displaying programs that are not likely to interest the user (e.g., programs that do not meet search criteria). In addition or alternatively, the guide manager application 205a may present the personalized programming guide as one or more "virtual channels" whereby the search results are organized and displayed according to the search criteria. For example, each search criteria becomes the label for the respective virtual channel and programming content meeting the search criteria are displayed under the label within the guide even though the programming content may be provided by any number of "real" or physical channels. In either case, the guide manager application 205a can dynamically update the content of the personalized programming guide as the user navigates through the guide. For example, as the user navigates from one time period to the next in the personalized programming guide, the displayed guide information is updated according to the search criteria.

STB 201 may also interact with a PVR, such as digital video recorder (DVR) 219, to store received content that can then be manipulated by a user at a later point in time. In various embodiments, DVR 219 may be network-based, e.g., included as a part of the service provider network 101, collocated at a subscriber site having connectivity to STB 201, and/or integrated into STB 201. A display 215 may present programming guide information and related content provided via STB 201 to a user. In alternative embodiments, STB 201 may be configured to communicate with a number of additional peripheral devices, including: a PC 221, laptops, PDAs, cellular phones, monitors, mobile devices, handheld devices, as well as any other equivalent technology capable of presenting programming guide information and related content to a user, such as those computing, telephony, and mobile apparatuses described with respect to FIG. 1.

These peripherals may be configured to implement instances of a guide manager application (e.g., guide manager application 205b) to access, share, or otherwise manipulate programming guide information and related content stored and/or processed by STB 201. For example, a programming content stream 211a may be received by STB 201 and recorded by DVR 219, wherein PC 221 may later access and view the stored content. Moreover, the peripheral devices may be configured to program or otherwise control the functions of STB 201. For instance, a guide manager application 205b executed on PC 221 may receive input from a user specifying display or creation of a personalized programming guide for the content that is accessible over a data network. A communication interface (not illustrated) of PC 221 may be configured to retrieve the guide and content information over the data network (e.g., packet-based network 105), wherein STB 201 may receive a programming content stream 211b from PC 221 to present to the user via display 215.

In another embodiment, user input to STB 201 and/or a peripheral device (e.g., PC 221) executing an instance of a guide manager application (e.g., guide manager application 205a and/or 205b) may cause a specified personalized programming guide and/or related content to be made available at another STB (e.g., STB 103b-103n) or a computing, telephony, or mobile device capable of processing audio and/or video streams. The specified personalized programming guide and/or the search criteria used to create the guide may also be shared among a community of other users or STBs 103a-103n. Still further, user input to a network-based guide manager application 115c, implemented on, for instance, server 223, may be configured to create a personalized programming guide or otherwise control the functions of STB 201. For instance, a user may access guide manager application 115c via an end terminal 117 (e.g., PC 221, a mobile handset, etc.), over one or more data networks (e.g., network 101, 105, and/or 107), to locate, specify, share, and/or transmit programming guide information and related content to STB 201. In this manner, server 221 (or other component of system 100, such as programming service provider 111) may, when suitable, transmit specified guide information and related content as stream 211*c* to STB 201 for presentation at display 215.

Furthermore, STB 201 may include a communication interface 225 configured to receive content streams from the programming service provider 111, PC 221, server 223, or other programming content source, such as media source 203. Communication interface 225 may optionally include single or multiple port interfaces. For example, STB 201 may establish a broadband connection to multiple sources transmitting content to STB 201 via a single port, whereas in alternative embodiments, multiple ports may be assigned to the one or more sources. In still other embodiments, communication interface 225 may be configured to permit users, via STB 201, to transmit data (including media content) to other users with STBs, a programming service provider 111, or other content source/sink.

According to various embodiments, STB 201 may also include inputs/outputs (e.g., connectors 227) to display 215 and DVR 219, as well as an audio system 229. In particular, audio system 229 may comprise a conventional audio-video receiver capable of monaural or stereo sound, as well as multichannel surround sound. Audio system 229 may include speakers, ear buds, headphones, or any other suitable component configured for personal or public dissemination. As such, STB 201, display 215, DVR 219, and audio system 229, for example, may support high resolution audio and/or video streams, such as high definition television (HDTV) or digital theater systems high definition (DTS-HD) audio. Thus, STB 201 may be configured to encapsulate data into a proper format with required credentials before transmitting onto one or more of the networks of FIG. 1 and de-encapsulate incoming traffic to dispatch data to display 215 and/or audio system 229.

In an exemplary embodiment, display 215 and/or audio system 229 may be configured with internet protocol (IP) capability (i.e., includes an IP stack, or is otherwise network addressable), such that the functions of STB 201 may be assumed by display 215 and/or audio system 229. In this manner, an IP ready, HDTV display or DTS-HD audio system may be directly connected to one or more service provider networks 101, packet-based networks 105, and/or telephony networks 107. Although STB 201, display 215, DVR 219, and audio system 229 are shown separately, it is contemplated that these components may be integrated into a single component, or other combination of components.

An authentication module 233 may be provided at STB 201 to initiate or respond to authentication schemes of, for instance, service provider network 101 or various other content providers, e.g., broadcast television systems 123, third-party content provider systems 125, or servers 119. Authentication module 233 may provide sufficient authentication information, e.g., a user name and password, a key access number, a unique machine identifier (e.g., MAC address), and the like, as well as combinations thereof, to a corresponding network interface for establishing connectivity. As described earlier, one or more digital certificates may be simultaneously mapped. Moreover, authentication at STB 201 may identify and authenticate a second device (e.g., PC 221) communicatively coupled to, or associated with, STB 201, or vice versa. Further, authentication information may be stored locally at memory 231, in a repository (not shown) connected to STB 201, or at a remote repository, e.g., user profile repository 121.

Authentication module 233 may also facilitate the reception of data from single or disparate sources. For instance, STB 201 may receive broadcast video from a first source (e.g., IPTV system 111), signals from a guide manager application at second source (e.g., server 119), and a programming content stream from a third source accessible over a data network (e.g., content repository 109). As such, display 215 may present the broadcast video, guide manager application, and programming content stream to the user. This presentation may be experienced separately, concurrently, in a toggled fashion, or with zooming, maximizing, minimizing, or trick capabilities, or equivalent mode. In other exemplary embodiments, authentication module 233 can authenticate a user to allow them to specify a personalized programming guide and related content that is to be presented to or shared with other STBs (e.g., STB 103*a*-103*n*).

A presentation module 235 may be configured to receive data streams 211*a*-211*c* (e.g., audio/video feed(s) including programming guide information and related content retrieved over the service provider network 101) and output a result via one or more connectors 227 to display 215 and/or audio system 229. In this manner, presentation module 235 may also provide a user interface for guide manager application 205*a* via display 215. Aural aspects of guide manager application 205*a* (e.g., audible alerts and cues) may be presented via audio system 229 and/or display 215. In certain embodiments, guide manager application 205*a* may be overlaid on the video content output 213 of display 215 via presentation module 235.

Connector(s) 227 may provide various physical interfaces to display 215, audio system 229, as well as other peripherals; the physical interfaces may include, for example, RJ45, RJ11, high definition multimedia interface (HDMI), optical, coax, FireWire, wireless, and universal serial bus (USB), or any other suitable connector. The presentation module 235 may also interact with a control device 209 for determining particular media content that a user desires to experience. In an exemplary embodiment, the control device 209 may comprise a remote control (or other access device having control capability, such as a PC 221, wireless device, mobile phone, etc.) that provides a user with the ability to readily manipulate and dynamically change parameters affecting the personalized programming guide and related content being viewed. In other examples, STB 201 may be configured for voice recognition such that STB 201 may be controlled with spoken utterances.

In this manner, control device 209 may include (not shown) a cursor controller, trackball, touch screen, touch pad, keyboard, and/or a key pad for activating guide manager application 205*a*, navigating through the personalized programming guide, selecting programming content, as well as performing other control functions. For instance, control device 209 may be utilized to maximize a guide manager application, navigate through displayable interfaces, create/locate/specify/retrieve personalized programming guides, modify STB 201 parameters, or toggle through one or more personalized programming guides and a general programming guide. Control device 209 may also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like.

Further, the control device 209 may comprise a memory (not illustrated) for storing preferences, search criteria, community identification, etc. affecting the personalized programming guide and related content that is being viewed, which can be conveyed to STB 201 through an input interface 237. The input interface 237 may support any type of wired and/or wireless link, e.g., infrared, radio frequency (RF), BLUETOOTH, and the like. Thus, control device 209 may store user or community preferences and/or search criteria with respect to creating a personalized programming guide, such as favorite keywords, previous searches, recording history, viewing history, programming preferences, etc. Alternatively, user and/or community preferences may be tracked, recorded, or stored in STB 201 or in a network user profile repository 121. The preferences may be automatically retrieved and activated by a user at any time. It is noted that the control device 209 may be separate from STB 201 or may be integrated within STB 201 (in which case certain input interface hardware and/or software may not be necessary).

Particular embodiments enable users, via control device 209, to populate or otherwise configure a user profile. For instance, a user profile application may be provided or accessed by STB 201 to enable users to populate a plurality of entry fields with user information. A user profile may include one or more customized or personalized settings that affect any aspect of creating a personalized programming guide via STB 201. More specifically, the profile may include: subscription information (account number, user name, password, avatar, moniker, etc.), subscriber demographics (age, gender, ethnicity, location of residence, zip code, school district, community, socioeconomic status, religion, marital status, ownerships, languages, mobility, life cycles, etc.), group/organizational affiliations (e.g., political), memberships, interests, buddies, friends, cohorts, system configurations, policies, associated users/devices, social networks, etc., as well as any other like personal information. Additionally, a user profile may include a "whitelist" specifying one or more accessible programming content sources/subjects, a "blacklist" specifying one or more programming content sources/subjects, as well as other equivalent customized settings, such as color schemes, sound effects, etc.

In other embodiments, the user profile may be established using the additional access devices described earlier, e.g., end terminal 117, such as PC 221. As such, user profile information may be stored in STB 201, e.g., in memory 231, and/or at a user site repository (not illustrated) directly connected to STB 201. Additionally or alternatively, profile information may be stored in a network-based repository (e.g., remote user profile repository 121), control device 209, and/or any other storage medium. Similarly, STB 201 (via memory 231), a user site repository, and/or a network-based repository may store a "MY CONTENT" collection of guide information, search criteria, personalized programming guides, digital audio, video and/or pictographic content accumulated by a user. This collection may also include a plurality of identifiers (or bookmarks) to other personalized programming guides accessible over a data network (e.g., available from a community of users), wherein the selection of a particular identifier may cause one or more guide manager applications 205a-205c to obtain a personalized programming guide from an associated link (either directly from a data network source (e.g., content repository 109) or indirectly from server 119 and/or programming service provider 111).

Thus, under arrangements of FIGS. 1 and 2, a user may create, experience (e.g., locate, specify, and receive), as well as share (e.g., transmit) personalized programming guides. The operation of STB 201 and one or more media manager applications 205a-205c, in conjunction with the components of system 100, will now be described with respect to creating a personalized programming guide.

Figure 3:
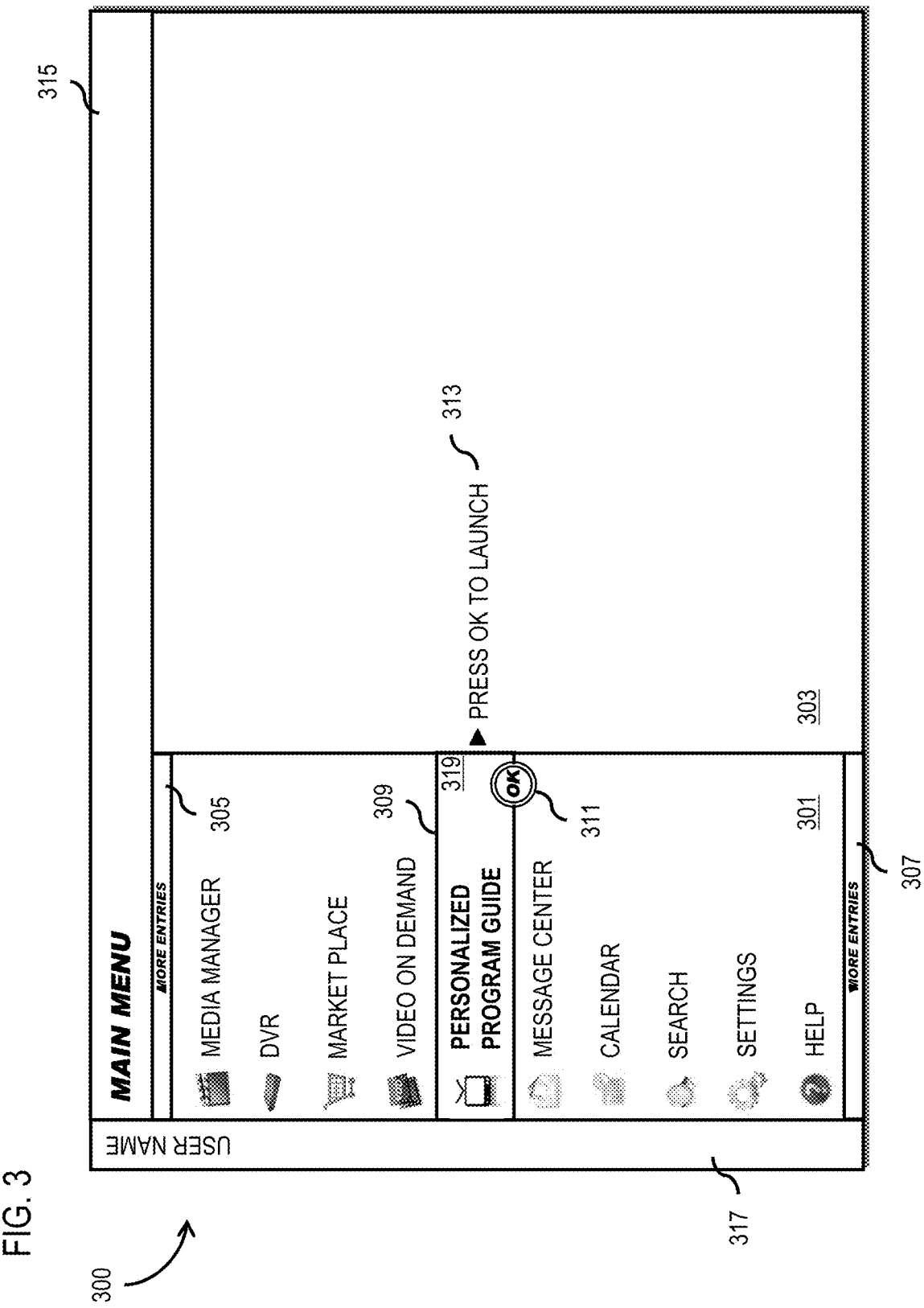
FIG. 3 is a diagram of a main menu user interface of the set-top box of FIG. 2, according to an exemplary embodiment.

As there may be a relatively large number of programming content sources and even more content instances available to users, STB 201 may include a user interface configured to allow users to seamlessly access the functions of STB 201, the available personalized programming guides, related media content, and one or more of the guide manager applications 205a-205c. It is recognized; however, that the user interface may be implemented at one or more end terminals 117 (e.g., PC 221) or accessible via server 119 or programming service provider 111. Thus, the user interface may be displayed to the user as part of a guide manager application accessed over a suitable communications link. Namely, web pages may be displayed to the user as part of an online guide manager application accessed over an Internet communications link. Accordingly, FIG. 3 is a diagram of a main menu user interface of the set-top box of FIG. 2, according to an exemplary embodiment.

The main menu 300 interface may be evoked using a number of different methods. For example, the user may select a dedicated "MENU" button on control device 209 or a peripheral device communicatively coupled thereto (e.g., PC 221, a mobile handset, etc.). It is recognized that any other suitable actuator of these devices may be additionally, or alternatively, used to access the functionality of main menu 300, such as triggering a "GUIDE" icon. Further, main menu 300 may be evoked by selecting an option within another interface or application (e.g., when navigating from a public screen to a user-specific screen, i.e., a private screen). As such, an executing device (e.g., STB 201, PC 221, etc.) may require sufficient authentication information (e.g., username and password, etc.) to be input in order to access the functions of main menu 300.

As shown, interface (or screen) 300, providing a "Main Menu," may include one or more interactive viewing panes, such as panes 301 and 303. In particular embodiments, as will be described in more detail below, the content of pane 303 may be dynamically updated to display various information related to actions conducted within pane 301, and vice versa. Pane 301 includes a listing of selectable entries corresponding to one or more features (or options) that may be provided via STB 201. For example, entries can include: program guide functions, DVR options, marketplace (shopping) options, on-demand programming options, media manager features, messaging and communications features, searching options, settings, help features, and the like. In certain embodiments, graphical elements may be provided to correspond to one or more of the entries, and may be displayed therewith.

Header 305 and footer 307 fields may be provided and configured to indicate the existence of additional entries not displayed, but navigably available. Accordingly, users may browse through these entries via, for instance, control device 209. A fixed focus state (e.g., border 309) and/or distinctive magnification features, e.g., color, brightness, bolding, font type, text size, etc., may be used to convey a "currently" navigated position. In this manner, when a user navigates to a desired entry, actuation of, for instance, an "OK" button on control device 209 may launch corresponding features and/or applications of the particular entry. In some embodiments, an interactive "OK" option 311 may be utilized. Moreover, main menu 300 may include tooltips (e.g., tooltip 313) when a user navigates to a particular entry. In other embodiments, an aural description of the entry navigated to and methods of interaction may be provided.

In other embodiments, main menu 300 may provide navigation fields 315 and 317 to facilitate usability. For example, field 315 may provide the name of the function/option being accessed, e.g., "MAIN MENU." In this manner, when a user accesses a new function/option, field 315 is automatically updated. Field 317 may be utilized to indicate the user profile currently authenticated to system 100, e.g., "USER NAME." Thus, a user may access a guide manager application (e.g., guide manager application 205*a*) by navigating to and selecting entry 319 of main menu 300. In exemplary embodiments, one or more guide manager applications 205*a*-205*c* may be utilized to create a personalized programming guide for presentation to a user via STB 201.

Figure 4:
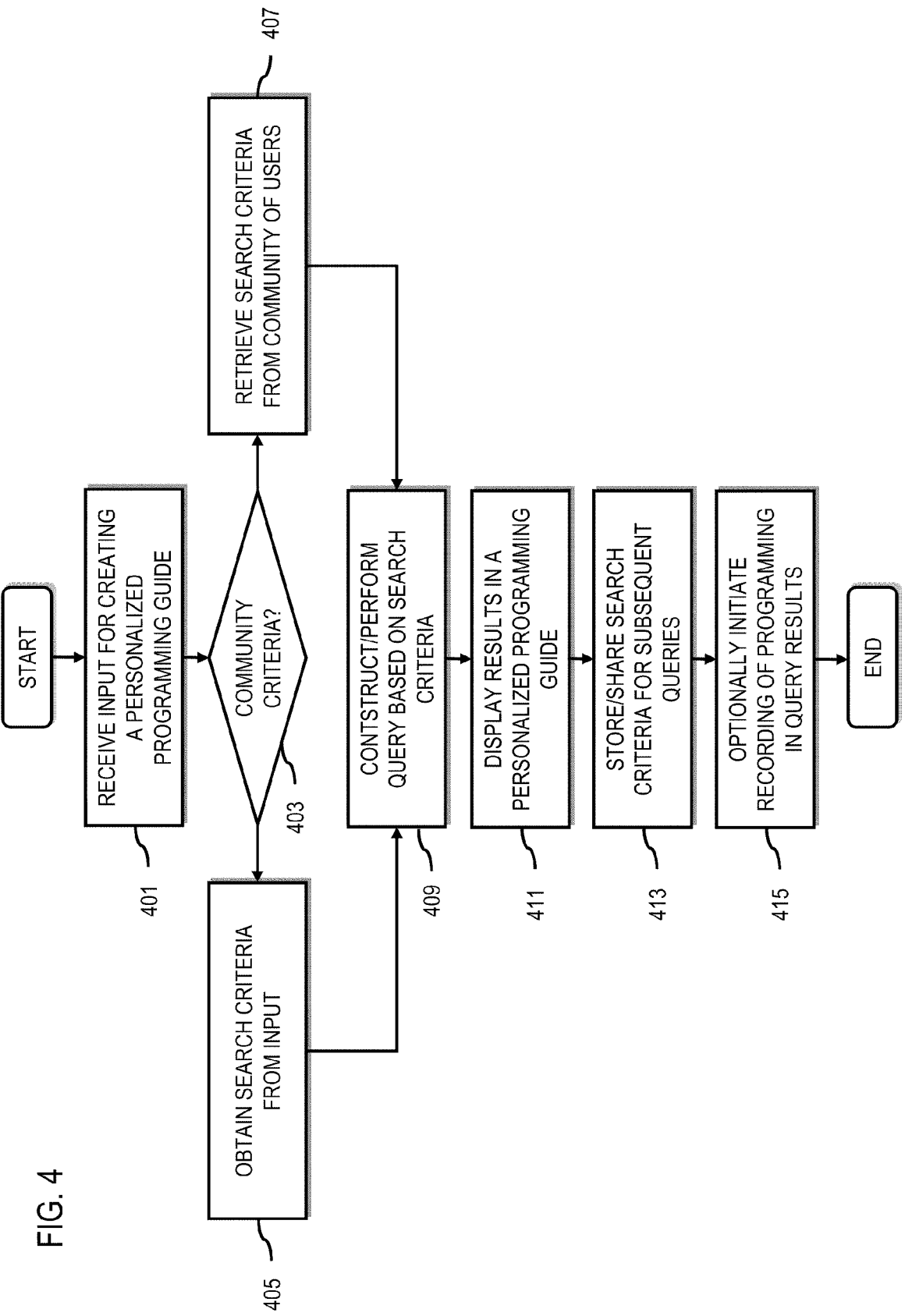
FIG. 4 is a flowchart of a process for creating a personalized programming guide, according to an exemplary embodiment.

FIG. 4 is a flowchart of a process for creating a personalized programming guide, according to an exemplary embodiment. In one embodiment, the process of FIG. 4 is performed by one or more guide manager applications 205*a*-205*c*. At step 401, a guide manager application 205*a* receives input for creating a personalized programming guide. By way of example, the user may specify the input via the STB 201 using control device 209. In exemplary embodiments, the user may specify criteria such as keywords, recommendations, history of the user's recordings or viewing habits, programming type, or a combination thereof. As previously discussed, the input may include user-specified search criteria for creating the personalized guide or may specify information for retrieving the search criteria from one or more communities of users. Accordingly, at step 403, the guide manager application 205*a* determines whether to use community search criteria, user-specified search criteria, or both. It is contemplated that the search criteria can be any criteria capable distinguishing one program from another program.

If the search criteria are user-specified, the guide manager application 205*a* extracts the search criteria from the user input (step 405). In addition or alternatively, the guide manager application 205*a* may prompt the user to provide additional input for specifying the search criteria. If the search criteria is to be obtained from a community of other users (at step 407), the guide manager application 205*a* retrieves the search criteria from the community of users specified in the input provided by the user and/or from one or more predetermined communities of users. In one embodiment, the community of other users can be specified by the user, the service provider network 101, the content provider systems 125, the television broadcast system s123, and the like. For example, the user or providers may specify communities based on similar characteristics (e.g., subscribers who favor sports programming) or may provide for a community including a broad cross-section of users (e.g., all television subscribers). The retrieved search criteria may then represent the most frequently accessed, viewed, recorded, recommended, etc. search criteria observed for the selected community or communities. It is contemplated that any method (e.g., voting by community members, tracking of member viewing habits, inferring from demographics, etc.) may be used to determine search criteria for a particular community.

After obtaining the one or more search criteria, the guide manager application 205*a* then, for instance, constructs a query based on the one or more search criteria and performs the query or search of the general programming guide data available over the service provider network 101 to construct a personalized programming guide (step 409). In one embodiment, the guide manager application 205*a* performs the query on the metadata associated with the programming content. As described previously, the metadata associated with programming content includes descriptive information (e.g., name, programming type, rating, time, synopsis, channel, etc.) that is searchable by the guide manager application 205*a*. In another embodiment, the query may be performed on general programming guide data that includes a listing of all programs available and at least a subset of the metadata associated with the programming content. This general programming guide can be provided, for instance, by the programming service provider 111.

By way of example, one criterion is based on the use of one or more keywords for conducting the query. In this case, the user specifies any keyword (e.g., "football" or "military") or partial keyword (e.g., "foo" or "mil") as search criteria for creating a personalized programming guide. The guide manager application 205*a* then constructs a query for these keywords or partial keywords to apply to the general programming guide and/or the metadata associated with the programming content.

In another example, the criterion for conducting a query is based on recommendations for programming content that may be of interest to a user. The recommendations are provided by, for instance, other users (e.g., a community of users) via their respective set-top boxes, the service provider, content producers, third party sources, and the like. The recommendations may specify individual programming content; in which case, the guide manager application 205*a* can construct a query for programming content that either matches or is similar to the recommended programming content. In addition or alternatively, the recommendation may specify a subject or keyword associated for which the guide manager application 205*a* can query.

In another example, the criterion for conducting a query is based on the history of recordings, viewing history, or the like of the user or a specified community of users. In this case, the guide manager application 205*a* can track the programs recorded or viewed by the user or the community of users. This tracking includes monitoring and storing the metadata (e.g., title, description, channel, etc.) associated with the programming content recorded or watched by the user or the community members. The guide manager application 205*a* then constructs a query for programming this is similar (e.g., by subject, type, etc.) to the programs recorded or watched by the user.

In yet another example, the criterion for conducting a query can be based on the programming type of the content. The programming type is specified, for instance, in the metadata associated with the content and can include programming types based on video format (e.g., standard definition vs. high definition), category (e.g., news broadcasts, sporting events, reality shows, documentaries, etc.), duration (e.g., less than 30 minutes, less than 1 hour, etc.), and the like. The guide manager application 205*a* then constructs a query for programming content that matches the specified programming type.

After performing the query on the general programming guide or the metadata associated with programming content, the guide manager application 205*a* displays the results of the query as a personalized programming guide (step 411). As discussed previously, because the personalized programming guide contains only a subset of programs (e.g., those programs meeting the criteria of the applied query) from the general programming guide, a user is likely to more easily find and discover programs of interest in the personalized guide as opposed to the general guide. In one embodiment, the personalized programming guide is presented in the same format as the general programming guide. For example, the format can include a grid delineating programming by channel and time. The guide can also be listed by the one or more criteria used to construct the corresponding query, displayed as a simple list, or presented as a combination thereof.

In certain embodiments, the guide manager application 205*a* may store the criteria used for performing the query and creating the personalized programming guide for later retrieval, use, and/or sharing with one or more community of users (step 413). The guide manager application 205a may store the criteria in, for instance, the user profile repository 121. By storing just the query criteria, the guide manager application 205a reduces the need to store the entire results of the query. Additionally, the guide manager application 205a need only share the criteria associated with a personalized programming guide to enable other STBs or community of STBs to reconstruct the same personalized programming guide.

If the STB (e.g., STB 201) is connected to a DVR 219 or equivalent, the guide manager application 205a can optionally record programming content included in the personalized programming guide for later viewing (step 415). It is contemplated that the user can configure the options based, at least in part, on the availability of recording space on the DVR 219 and the number of programs to record.

Figure 5:
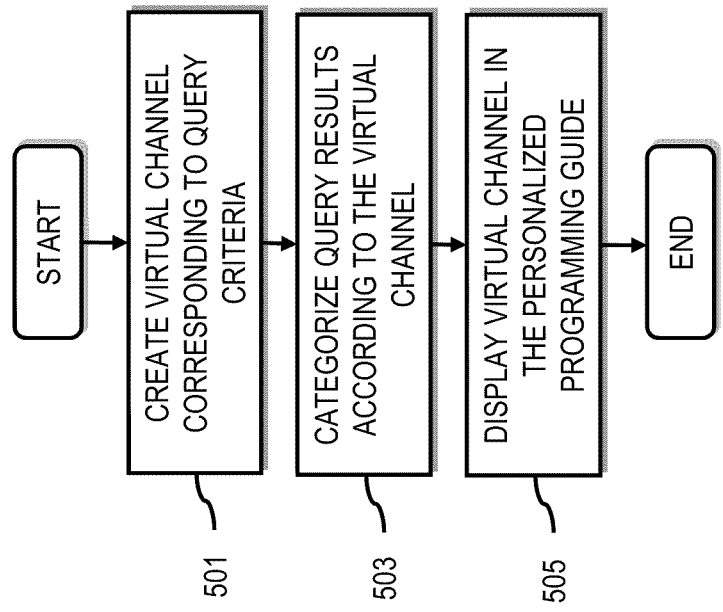
FIG. 5 is a flowchart of a process for creating a virtual channel for display in a personalized programming guide, according to an exemplary embodiment.

FIG. 5 is a flowchart of a process for creating a virtual channel for display in a personalized programming guide, according to an exemplary embodiment. In one embodiment, the process of FIG. 5 is performed by one or more guide manager applications 205a-205c. In addition, the process of FIG. 5 assumes that the guide manager application 205a has already created a personalized guide according to the process of FIG. 4. At step 501, the guide manager application 205a creates a virtual channel corresponding to each of the one or more query criteria used to create the personalized programming guide. As used herein, the term "virtual channel" refers to the collection of programming content matching a particular query search criterion. For example, a query criterion may specify programming content matching a keyword such as "football." The guide manager application 205a may create a corresponding virtual channel titled "football" for presenting programming information associated with content matching the "football" query criterion.

After creating the one or more virtual channels, the guide manager application 205a categorizes the query results contained in the personalized programming guide according to the virtual channels (step 503). In other words, all programming content matching a particular search criterion is placed under the respective virtual channel. If a program matches multiple criteria, the program can be categorized in more than one respective virtual channel. Continuing with the "football" virtual channel example discussed above, the guide manager application 205a categorizes programming content that are contained in the search results and whose metadata includes the keyword "football" under the "football" virtual channel.

In the next step 505, the guide manager application 205a displays the one or more virtual channels and accompanying program listings in the personalized programming guide. In one embodiment, the virtual channel is displayed in the same format as other channels in either the personalized programming guide or the general guide. For example, if the format is a grid display, the guide manager application 205a displays the name of the virtual channel (e.g., "football") along with the program listings within the virtual channel organized in chronological order. It is noted that in some cases, multiple programs within the virtual may occur at the same time. In this case, the guide manager application 205a may display the one or more concurrent programs in different rows within the virtual channel.

Figure 6:
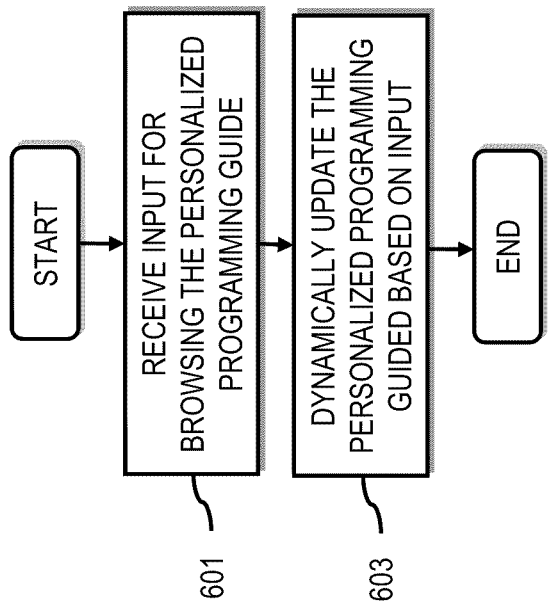
FIG. 6 is a flowchart of a process for browsing a personalized programming guide, according to an exemplary embodiment.

FIG. 6 is a flowchart of a process for browsing a personalized programming guide, according to an exemplary embodiment. As with the processes of FIGS. 4 and 5, one or more of the guide manager applications 205a-205c perform the process of FIG. 6. It is assumed that the guide manager application 205a has already created the personalized programming guide according to the process of FIG. 4. At step 601, the guide manager application 205a receives input for browsing the personalized programming guide. In this example, browsing includes for instance navigating between channels and/or times listed in the personalized programming guide. In one embodiment, the browsing input is specified via the STB 201 using control device 209.

In response to the browsing input, the guide manager application 205a dynamically updates the program listing displayed in the personalized programming guide based on the input (step 603). For example, if the browsing input directs the guide manager application 205a to move from one channel to another, the guide manager application 205a updates the listing for the newly browsed channel with content matching the applied query criteria. In one embodiment, the guide manager application 205a can query all available programming content and store this query results for retrieval and presentation. If this is the case, on browsing, the guide manager application retrieves the stored query results for the channel and time to which the user has browsed. This approach has the advantage of providing faster response times when browsing a guide, but requires more storage space. Alternatively, the guide manager application 205a can perform the query only on the programming that is associated with the channels and times visible on the display at any particular time. As the user browses the guide, the guide manager application 205a updates the query results based on the channels and times in the display.

Figure 7B:
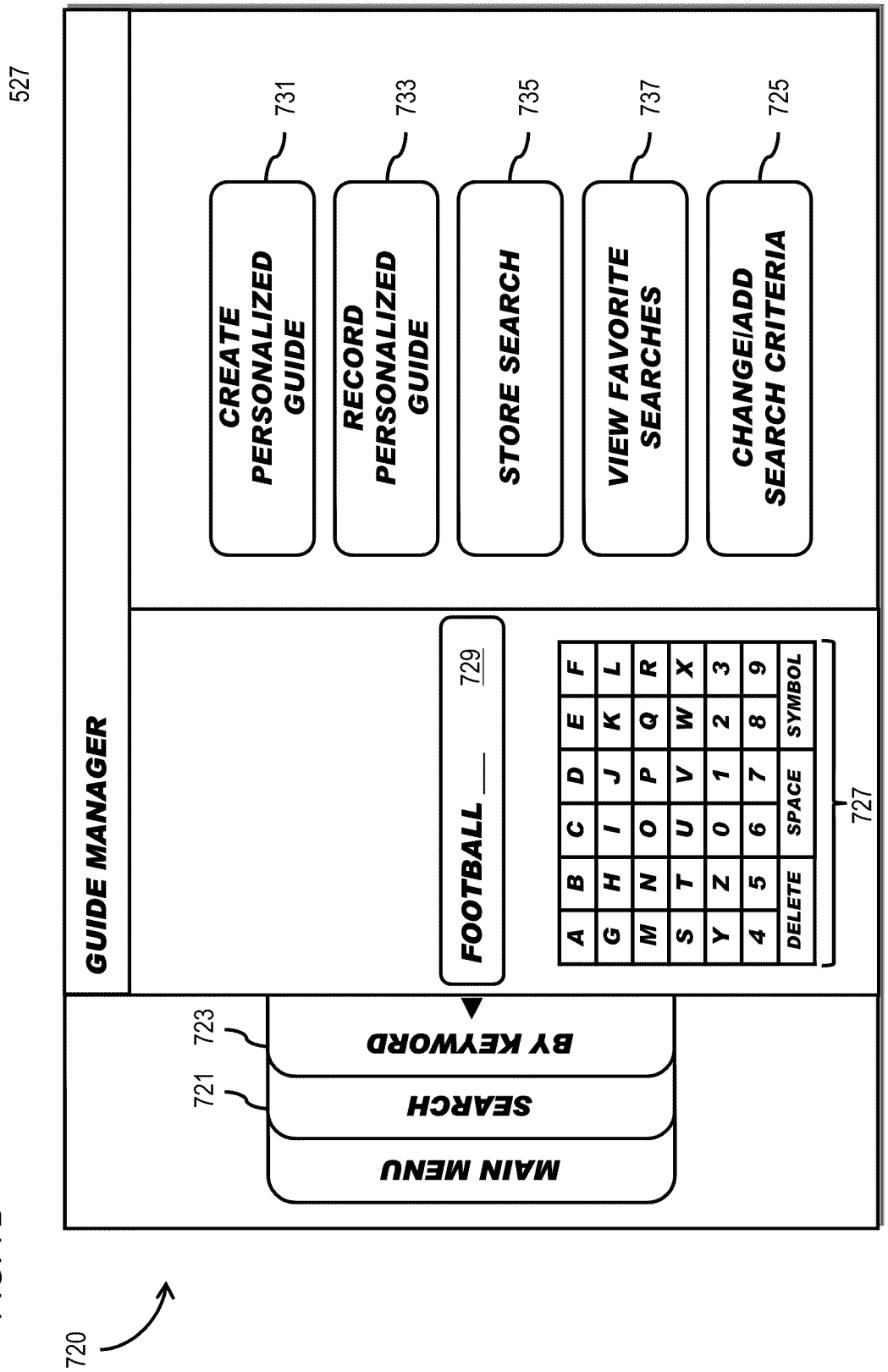

FIGS. 7A-7D are diagrams of user interfaces utilized in the processes of FIGS. 4-6, according to various embodiments. The user interface 700 of FIG. 7A depicts a general programming guide presented on a display connected to, for instance, STB 201. As discussed previously, the general programming guide contains a listing of all programming content available to the STB 201 over the service provider network 101. By way of example, the programming guide may be displayed by initiating a command via the control device 209 by pressing a "Guide" button or other button or combination of buttons. In other instances, the guide may be selected by selecting the guide option from an on-screen menu or other like mechanisms. As shown in FIG. 7A, the guide manager application 205a presents the general programming guide in a grid format organized by channels 701 (e.g., channels 4, 9, 11, and 20) and times 703 (e.g., 4:00 PM through 5:00 PM). Each program listing is presented in the guide under its respective channel 701 and time 703. In one embodiment, the user interface 700 indicates the currently selected channel in the programming guide by enlarging the display of the channel row relative to the other channels in the grid. In addition or alternatively, the guide manager application 205a may present the programming guide as a simple list or other format. To assist the user in identifying the user interface 700, the programming guide includes a title 705. In addition, the user interface 700 provides menu option 707 to return to a main menu of the STB 201 and a menu option 709 to access the guide manager application 205a.

On selecting the guide manager menu option 709, the user can access the functions of the guide manager application 205a. FIG. 7B depicts a user interface 720 for inputting one or more search criteria to create a personalized programming guide, according to an exemplary embodiment. In this example, the user interface 720 indicates that that the user has selected the guide manager application 205a to create a programming guide by keyword as shown by selection of the menu option 721 to search and the more specific menu option 723 to search by keyword. The user also has the option to change or add the search criteria by selection option 725. This option, for instance, enables the user to select other criteria such as recommendations, recording or viewing history, or programming type to create a personalized programming guide. An onscreen keyboard 727 is provided to facilitate entering the selected criteria. As shown in the text entry area 729, the user has entered the keyword "football." To initiate the creation of the personalized programming guide using a query based on the keyword, the user can select the option 731 to create the personalized guide. The user also has several other options, for instance: (1) option 733 to initiate recording of the programming listed the created personalized guide, e.g., via DVR 219; (2) option 735 to store the search criteria for later use; and (3) option 737 to view favorite search criteria such as the search criteria stored using option 735.

FIG. 7C depicts a user interface 740 for displaying a personalized programming guide, according to an exemplary embodiment. The example of FIG. 7C is a personalized version of the general programming guide depicted in FIG. 7A. The user interface 740 uses the same grid format of user interface 700 to display programming content filtered based on the keyword "football." By way of example, the user has created a personalized programming guide as described in FIG. 4 using the user interface 720 of FIG. 7B. Accordingly, the guide manager application performed the requested query on the general programming guide to display only those programs matching the search criteria (e.g., football). The user interface 740 includes a title 741 to indicate that the displayed programming guide is a personalized programming guide based on the keyword "football." As shown in the grid area 743, the guide manager application 205*a* displays only those programs that meeting the criteria. For example, any channels that do not contain any matching programs are not displayed. Similarly, within a channel that is displayed because it contains a matching program, any program that does not match the criteria is not displayed. In this way, the user can immediately see only those programs that are likely to be of interest to the user. The user may then select to view or record a program in the personalized programming guide by directly selecting the desired program.

Figure 7D:
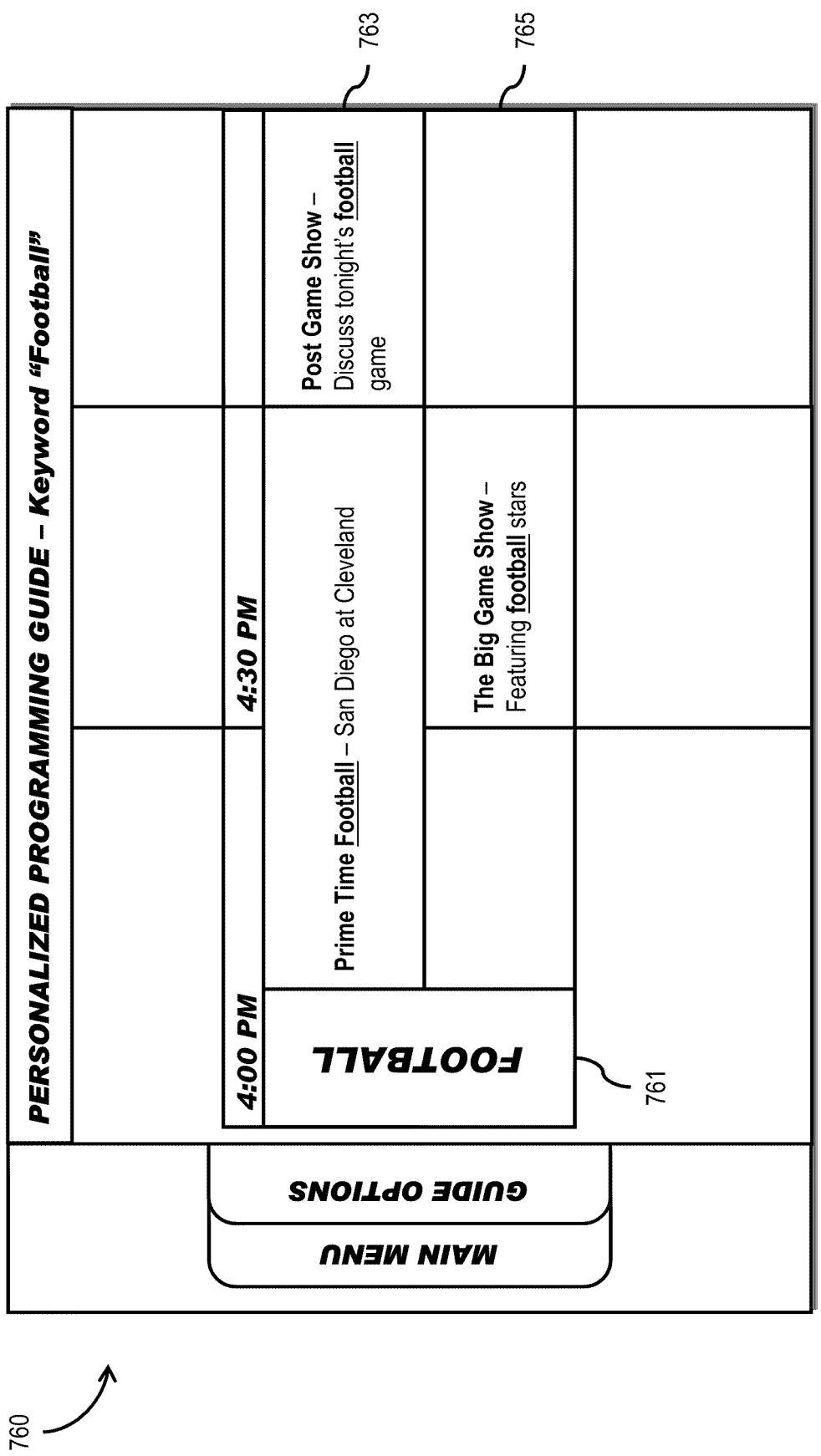

FIG. 7D depicts a user interface 760 for displaying a personalized programming guide using a virtual channel, according to an exemplary embodiment. The user interface 760 depicts the same personalized programming guided as depicted in user interface 740 with the exception that the program listings are organized into a virtual channel. As discussed previously, the virtual channel is based on the search criteria and any programming content matching the criteria is displayed in the programming guide as if the criteria were an actual channel. As shown, a virtual channel 761 is created based on the keyword search criteria "football." In a grid format, all programming content matching the search criteria are displayed in the row 763 belonging to the virtual channel 761 regardless of the programming content's actual channel. If more than one program that matches the search criteria falls in the same time slot the user interface 760 displays the overlapping program within another row 765 of the virtual channel 761. In this way, the guide manager application 205*a* can aggregate all matching program into a more compact display. It is contemplated that if multiple virtual channels may be presented in the same personalized programming guide.

One of ordinary skill in the art would recognize that the processes described above may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 8:
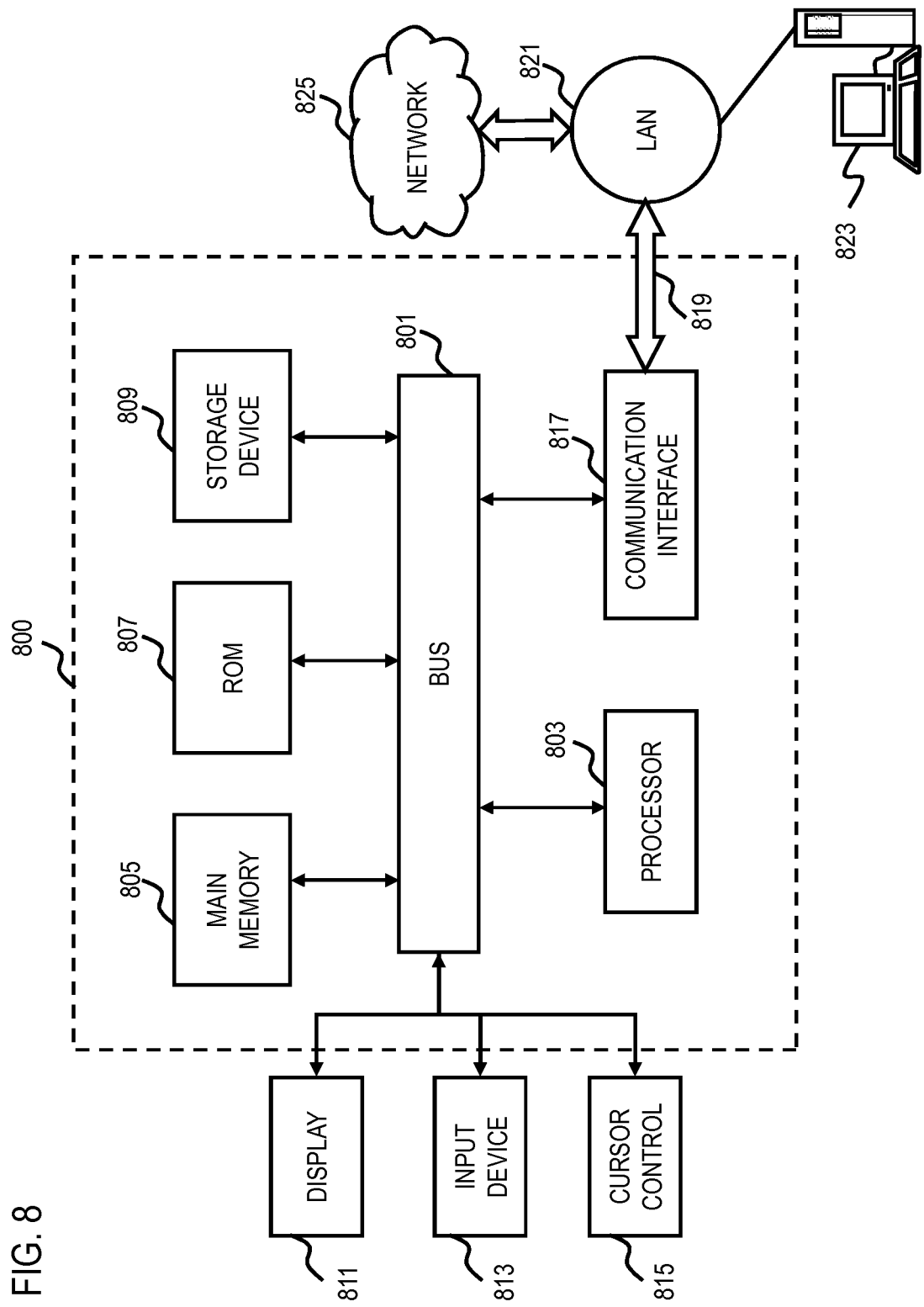
FIG. 8 is a diagram of a computer system that can be used to implement various exemplary embodiments.

FIG. 8 illustrates computing hardware (e.g., computer system) upon which an embodiment according to the invention can be implemented. The computer system 800 includes a bus 801 or other communication mechanism for communicating information and a processor 803 coupled to the bus 801 for processing information. The computer system 800 also includes main memory 805, such as random access memory (RAM) or other dynamic storage device, coupled to the bus 801 for storing information and instructions to be executed by the processor 803. Main memory 805 also can be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
receiving an input from a user for creating a personalized programming guide;
based at least in part on the input, retrieving one or more search criteria associated with a community of other users and with the user,
wherein the one or more search criteria associated with the user are, at least in part, extracted from the user input, and
wherein the one or more search criteria associated with the community of other users are, at least in part, determined based on voting by members of the community of other users;
constructing a query solely from the one or more search criteria associated with the community of other users and with the user;
performing the query on general programming guide data; and
displaying results of the query as the personalized programming guide,
wherein the one or more search criteria include a keyword,
wherein the personalized programming guide presents the user with programs in one common virtual channel corresponding to the one or more search criteria,
wherein the personalized programming guide is presented separately from any other programming guide, and as a grid or list of said programs with viewing time and without indication of actual channel that the programs belong to, with said one common virtual channel displaying the keyword and only the programs which are of interest to the user based on the query, and from which the user can select for viewing and/or recording, and
when more than one program that corresponds to the one or more search criteria falls in a same time slot, the personalized programming guide displays an overlapping program within another row of the virtual channel.

2. A method of claim 1, wherein the community of other users is specified by the user, a service provider, a content provider, a social networking service, or a combination thereof.

3. A method of claim 2, wherein the personalized programming guide specifies broadcast content, digital video recorder (DVR) content, pay-per-view content, Internet Protocol Television (IPTV) content, pre-recorded media content, data communication services content, Internet-based content, locally-stored content, or a combination thereof.

4. A method of claim 1, wherein the input includes a set of search criteria specified by the user, the method further comprising:
sharing the set of search criteria specified by the user with the community of other users.

5. A system of claim 4, wherein the personalized programming guide specifies broadcast content, digital video recorder (DVR) content, pay-per-view content, Internet Protocol Television (IPTV) content, pre-recorded media content, data communication services content, Internet-based content, locally-stored content, or a combination thereof.

6. A method of claim 1, further comprising:
receiving another input from the user for browsing the personalized programming guide; and
dynamically updating the personalized programming guide based on the another input.

7. A method of claim 1, wherein the one or more search criteria associated with the user further include viewing histories, recording histories, programming types, or a combination thereof.

8. A method of claim 1, wherein the personalized programming guide specifies broadcast content, digital video recorder (DVR) content, pay-per-view content, Internet Protocol Television (IPTV) content, pre-recorded media content, data communication services content, Internet-based content, locally-stored content, or a combination thereof.

9. A set-top box apparatus comprising:
an input interface configured to receive an input from a user for creating a personalized programming guide; and
a programming guide module configured retrieve one or more search criteria associated with a community of other users, with the user, or both based on the input, construct a query solely from the one or more search criteria associated with the community of other users and with the user, perform the query on general programming guide data, and display results of the query as the personalized programming guide,
wherein the one or more search criteria associated with the user are extracted from the user input,
wherein the one or more search criteria associated with the community of other users are determined based on voting by members of the community of other users,
wherein the one or more search criteria include a keyword,
wherein the personalized programming guide presents the user with programs in one common virtual channel corresponding to the one or more search criteria,
wherein the personalized programming guide is presented separately from any other programming guide, and as a grid or list of said programs with viewing time and without indication of actual channel that the programs belong to, with said one common virtual channel displaying the keyword and only the programs which are of interest to the user based on the query, and from which the user can select for viewing and/or recording, and
when more than one program that corresponds to the one or more search criteria falls in a same time slot, the personalized programming guide displays an overlapping program within another row of the virtual channel.

10. An apparatus of claim 9, wherein the community of other users is specified by the user, a service provider, a content provider, a social networking service, or a combination thereof.

11. An apparatus of claim 10, wherein the personalized programming guide specifies broadcast content, digital video recorder (DVR) content, pay-per-view content, Internet Protocol Television (IPTV) content, pre-recorded media content, data communication services content, Internet-based content, locally-stored content, or a combination thereof.

12. An apparatus of claim 9, wherein the input includes a set of search criteria specified by the user, and wherein the programming guide module is configured to share the set of search criteria specified by the user with the community of other users.

13. An apparatus of claim 12, wherein the personalized programming guide specifies broadcast content, digital video recorder (DVR) content, pay-per-view content, Internet Protocol Television (IPTV) content, pre-recorded media content, data communication services content, Internet-based content, locally-stored content, or a combination thereof.

14. An apparatus of claim 9, wherein the input interface is configured to receive another input from the user for browsing the personalized programming guide, and wherein the programming guide module is configured to dynamically update the personalized programming guide based on the another input.

15. An apparatus of claim 9, wherein the one or more search criteria associated with the user further include viewing histories, recording histories, programming types, or a combination thereof.

16. An apparatus of claim 9, wherein the personalized programming guide specifies broadcast content, digital video recorder (DVR) content, pay-per-view content, Internet Protocol Television (IPTV) content, pre-recorded media content, data communication services content, Internet-based content, locally-stored content, or a combination thereof.

17. A system comprising:
a programming guide manager configured to receive an input from a user for creating a personalized programming guide, retrieve one or more search criteria associated with a community of other users, with the user, or both based on the input, construct a query solely from the one or more search criteria associated with the community of other users, with the user, or both, perform the query on general programming guide data, and display results of the query as the personalized programming guide,
wherein the one or more search criteria associated with the user are extracted from the user input,
wherein the one or more search criteria associated with the community of other users are determined based on voting by members of the community of other users,
wherein the programming guide manager is coupled to a multimedia system with connectivity to a plurality of programming sources,
wherein the one or more search criteria include a keyword,
wherein the personalized programming guide presents the user with programs in one common virtual channel corresponding to the one or more search criteria,
wherein the personalized programming guide is presented separately from any other programming guide, and as a grid or list of said programs with viewing time and without indication of actual channel that the programs belong to, with said one common virtual channel displaying the keyword and only the programs which are of interest to the user based on the query, and from which the user can select for viewing and/or recording, and
when more than one program that corresponds to the one or more search criteria falls in a same time slot, the personalized programming guide displays an overlapping program within another row of the virtual channel.

18. A system of claim 17,
wherein the programming guide manager is configured to receive another input from the user for browsing the personalized programming guide, and
wherein the programming guide manager is configured to dynamically update the personalized programming guide based on the another input.

19. A system of claim 17, wherein the one or more search criteria associated with the user further include viewing histories, recording histories, programming types, or a combination thereof.

20. A system of claim 17, wherein the personalized programming guide specifies broadcast content, digital video recorder (DVR) content, pay-per-view content, Internet Protocol Television (IPTV) content, pre-recorded media content, data communication services content, Internet-based content, locally-stored content, or a combination thereof.

* * * * *